United States Patent
Ueki et al.

(10) Patent No.: US 9,840,633 B2
(45) Date of Patent: Dec. 12, 2017

(54) AQUEOUS WRITING TOOL FOR FOOD PRODUCT PACKAGING MATERIAL

(71) Applicants: ASAHI KASEI HOME PRODUCTS CORPORATION, Tokyo (JP); TAISEI CORPORATION, Saitama (JP)

(72) Inventors: Mika Ueki, Tokyo (JP); Yoshiko Sasaki, Tokyo (JP); Saichi Hiraizumi, Saitama (JP)

(73) Assignees: ASAHI KASEI HOME PRODUCTS CORPORATION, Tokyo (JP); TAISEI CORPORATION, Saitama (JP)

( * ) Notice: Subject to any disclaimer, the term of this patent is extended or adjusted under 35 U.S.C. 154(b) by 0 days.

(21) Appl. No.: 15/249,641

(22) Filed: Aug. 29, 2016

(65) Prior Publication Data
US 2017/0058136 A1    Mar. 2, 2017

(30) Foreign Application Priority Data

Aug. 31, 2015  (JP) ................................ 2015-170984
Aug. 5, 2016   (JP) ................................ 2016-154435

(51) Int. Cl.
*C08L 27/12*    (2006.01)
*C09D 11/17*    (2014.01)

(52) U.S. Cl.
CPC .............. *C09D 11/17* (2013.01); *C08L 27/12* (2013.01)

(58) Field of Classification Search
None
See application file for complete search history.

(56) References Cited

U.S. PATENT DOCUMENTS

| | | | | |
|---|---|---|---|---|
| 5,510,397 A | * | 4/1996 | Okuda | C09D 11/16 260/DIG. 38 |
| 2002/0040066 A1 | * | 4/2002 | Khan | B01D 19/0409 516/113 |
| 2015/0105504 A1 | * | 4/2015 | Verheggen | C09D 11/10 524/108 |
| 2015/0376423 A1 | * | 12/2015 | Kadowaki | C09D 11/18 401/209 |

FOREIGN PATENT DOCUMENTS

| | | | | |
|---|---|---|---|---|
| JP | 63145382 A | * | 6/1988 | ............ C09D 11/16 |
| JP | 2008-163174 | | 7/2008 | |

OTHER PUBLICATIONS

U.S. Appl. No. 15/249,650 to Ueki et al., filed Aug. 29, 2016.

* cited by examiner

*Primary Examiner* — Richard A Huhn
(74) *Attorney, Agent, or Firm* — Greenblum & Bernstein, P.L.C.

(57) ABSTRACT

[Problem to be Solved] An object of the present invention is to provide an aqueous writing tool for a food product packaging material, which can provide written products having high color developability and fixing properties upon writing on food product packaging materials.
[Solution] An aqueous writing tool for a food product packaging material comprising an ink comprising two or more pigments and one or more dispersants, wherein
at least one of the pigments being a white pigment,
the total content of the pigments being 10 to 25% by mass based on the total amount of the ink, and
the total content of the dispersants being 1 to 5% by mass based on the total amount of the ink.

20 Claims, No Drawings

AQUEOUS WRITING TOOL FOR FOOD PRODUCT PACKAGING MATERIAL

TECHNICAL FIELD

The present invention relates to an aqueous writing tool for a food product packaging material.

BACKGROUND ART

Ink compositions enabling writing of dates and the like on plastic bags and ultrathin transparent films for food product packaging (wrap) containing food products to be stored are known, and examples of such known ink compositions include an ink composition for a writing tool comprising at least: a water-soluble dye; an alcohol-soluble and poorly water-soluble resin contained in an amount 3 times or more the water-soluble dye in the weight ratio; and water contained in an amount twice or more and 34 times or less the water-soluble dye in the weight ratio (Patent Literature 1).

CITATION LIST

Patent Literature

[Patent Literature 1] Japanese Patent Application Laid-Open No. 2008-163174

SUMMARY OF INVENTION

Problem to be Solved by the Invention

Unfortunately, the ink described in Patent Literature 1 is a so-called oil-based ink containing more than 70% by mass alcohol (organic solvent), and has possible disadvantages of permeation of the organic solvent into food product packaging materials and contamination of food products in the packaging materials by the permeated organic solvent. In contrast, conventional water-based inks have poor wettability, which causes difficulties upon writing on packaging materials.

In writing with an ink on light-transmissive food product packaging materials, in general, the ink transmits light. For this reason, the ink is unlikely to demonstrate its color developability, leading to difficulties in reading what is written thereon. In addition, an increase in the amount of the pigment used reduces the stability of the ink, and thereby readily generating deposits or reducing the fixing properties of the ink.

The present invention has been made in consideration of these problems, and an object of the present invention is to provide an aqueous writing tool for a food product packaging material, which can provide written products having high color developability and fixing properties upon writing on food product packaging materials.

Solution to Problem

Namely, the present invention is as follows.
[1] An aqueous writing tool for a food product packaging material comprising an ink comprising two or more pigments and one or more dispersants, wherein
at least one of the pigments being a white pigment,
the total content of the pigments being 10 to 25% by mass based on the total amount of the ink, and
the total content of the dispersants being 1 to 5% by mass based on the total amount of the ink.

[2] The aqueous writing tool for a food product packaging material according to [1], wherein
the dispersants comprise one or more dispersants selected from the group consisting of an inorganic particle, a polyoxyalkylene compound, and a poly(meth)acrylate.

Effect of Invention

The present invention has been made in consideration of the above-mentioned problems, and an object of the present invention is to provide an aqueous writing tool for a food product packaging material, which can provide written products having high color developability and fixing properties upon writing on food product packaging materials.

DESCRIPTION OF EMBODIMENT

An embodiment according to the present invention (hereinafter, referred to as "the present embodiment") will now be described in detail. The present invention will not be limited to the present embodiment, and various modifications can be made in the range not departing from the gist of the invention.

[Aqueous Writing Tool for Food Product Packaging Material]

The aqueous writing tool for a food product packaging material of the present embodiment comprises an ink comprising two or more pigments and one or more dispersants, wherein at least one of the pigments is a white pigment, the total content of the pigments is 10 to 25% by mass based on the total amount of the ink, and the total content of the dispersants is 1 to 5% by mass based on the total amount of the ink.

Any "food product packaging material" can be used without limitation, as long as it is generally used in the application use of food product packaging can be used without limitation. Examples thereof include wrap films, shrink films, and food product packaging bags. Examples of resins forming these packaging materials include vinylidene chloride, vinyl chloride, polyethylene, polypropylene, poly(ethylene terephthalate), poly(propylene terephthalate), or polymers thereof. Among these, food product packaging films (wrap films) made of vinylidene chloride is preferred.

Examples of the "food product packaging material" also include containers such as air-tight containers and storage containers. Examples of a material for such containers include polyethylene, polypropylene, poly(ethylene terephthalate), poly(propylene terephthalate), polymers thereof, or glass.

The term "aqueous" indicates that the main component contained is water, the content of the water-soluble organic solvent is preferably 0 to 40% by mass, more preferably 0 to 20% by mass, still more preferably 0 to 10% by mass, particularly preferably 0 to 5% by mass based on the total amount of the ink. A smaller content of the water-soluble organic solvent more significantly enhances the safety of the aqueous writing tool for food product packaging. The term "water-soluble" indicates that a material is miscible with water.

[Ink]

The ink comprises two or more pigments, water, and one or more dispersants, and may contain resin nanoparticles, a moisturizing agent, and other components when necessary. These components will now be described.

[Pigment]

Any two or more pigments can be used without limitation as long as at least one of the pigments is a white pigment.

The known pigments exemplified below can be used. Specifically, examples thereof include a combination of at least one white pigment and at least one color pigment, and a combination of two white pigments. The color pigment indicates a pigment other than the white pigment. Upon writing on transparent materials, light passes through an ink containing only a color pigment, leading to difficulties in reading written products (transcript on the food product packaging material with the adhering ink). In contrast, a white pigment contained in the ink can prevent light from passing through the ink (shielding properties), providing a written product having high color developability.

Examples of the white pigment include, but not limited to, C.I. Pigment White 6, 18, and 21, and white inorganic pigments of titanium oxide, zinc oxide, zinc sulfide, alumina, aluminum silicate, and zirconium oxide. Besides the white inorganic pigment, white organic pigments such as white hollow resin particles and polymer particles can also be used. Among these white pigments, titanium oxide is preferred. Use of such a white pigment further enhances the shielding properties of the written product.

Examples of the black pigment include, but not limited to, carbon black No. 2300, No. 900, MCF88, No. 33, No. 40, No. 45, No. 52, MA7, MA8, MA100, and No. 2200B (manufactured by Mitsubishi Chemical Corporation); Raven 5750, Raven 5250, Raven 5000, Raven 3500, Raven 1255, and Raven 700 (manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.); and Color Black FW1, Color Black FW2, Color Black FW2 V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (manufactured by Degussa AG).

Examples of pigments used in yellow inks include, but not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include, but not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, and 50.

Examples of cyan pigments include, but not limited to, C.I. Pigment Blue 1, 2, 3, 15, 15:1, 15:2, 15:3, 15:34, 15:4, 16, 18, 22, 25, 60, 65, 66, and C.I. Vat Blue 4 and 60.

Examples of pigments other than magenta, cyan, and yellow pigments used in the color inks include, but not limited to, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

Examples of pearl pigments include, but not limited to, pigments having pearlescence or interference gloss such as titanium dioxide, iron oxide-coated mica, argentine, and bismuth trichloride.

Examples of metallic pigments include, but not limited to, particles composed of single substances or alloys of aluminum, silver, gold, platinum, nickel, chromium, tin, zinc, indium, titanium, and copper.

In combination use of the color pigment with the white pigment, the content of the white pigment is preferably 5 to 25% by mass, more preferably 5 to 20% by mass, still more preferably 10 to 15% by mass based on the total amount of the ink. A content of the white pigment of not less than 5% by mass more significantly enhances the shielding properties and thus, more significantly enhances the color developability of the resulting written product. A content of the white pigment of 25% by mass or less more significantly enhances the dispersion stability of the ink.

In combination use of the color pigment with the white pigment, the content of the color pigment is preferably 5 to 15% by mass, more preferably 3.5 to 12.5% by mass, still more preferably 5 to 10% by mass based on the total amount of the ink. A content of the color pigment of not less than 2.5% by mass more significantly enhances the color developability of the resulting written product. A content of the color pigment of 15% by mass or less more significantly enhances the dispersion stability of the ink.

In use of only the white pigment, the content of the white pigment is preferably 5 to 25% by mass, more preferably 10 to 25% by mass, still more preferably 15 to 25% by mass based on the total amount of the ink. A content of the white pigment of not less than 5% by mass more significantly enhances the shielding properties and thus, more significantly enhances the color developability of the resulting written product. A content of the white pigment of 25% by mass or less more significantly enhances the dispersion stability of the ink.

The total content of the pigments is 10 to 25% by mass, preferably 12.5 to 25% by mass, more preferably 15 to 23% by mass based on the total amount of the ink. A content of the pigments of not less than 10% by mass more significantly enhances the color developability of the resulting written product. A content of the pigments of 25% by mass or less more significantly enhances the dispersion stability of the ink.

[Dispersant]

Examples of the pigment dispersant include, but not limited to, one or more dispersant selected from the group consisting of a water-soluble resin, an inorganic particle, a surfactant, and a water-soluble thickener generally used.

The total content of the dispersants is 1 to 5% by mass, preferably 1.5 to 4.5% by mass, more preferably 2 to 4% by mass based on the total amount of the ink. A total content of the dispersants of not less than 1% by mass more significantly enhances the dispersion stability of the pigment. A total content of the dispersants of 5% by mass or less prevents an increase in viscosity and more significantly enhances the writing performance of the writing tool.

(Inorganic Particles)

The ink may further contain inorganic particles. The inorganic particles contained in the ink reduces the contact angle of the ink, thereby providing an effect of preventing repellency and an anti-smear effect of the drawn lines. The inorganic particles may adhere onto the surface of the pigment to stabilize the pigment. The inorganic particles mat function as a protective colloid to reduce the contact area between the pigments, thereby preventing precipitation and aggregation of the pigment. As a result, the dispersibility of the pigment can be more significantly enhanced to stably disperse a larger amount of the pigment in the ink. With these advantageous effects, a large amount of the pigment can be used, therefore more significantly enhancing the color developability of the written product obtained using the ink.

Examples of the inorganic particles include, but not limited to, silicas such as fumed silica, calcined silica, sedimented silica, pulverized silica, fused silica, fine anhydrous silica, fine hydrated silica, hydrated aluminum silicate, and hydrated calcium silicate. Among these inorganic particles, silica has a very large specific surface area, which facilitates its dispersion.

The inorganic particles have a primary average particle size of preferably 0.1 to 10 μm, more preferably 0.5 to 5 μm. A primary average particle size of the inorganic particles of 0.5 μm or more tends to more significantly enhance the dispersibility of the pigment. A primary average particle size of the inorganic particles of 5 μm or less can prevent sedimentation of the inorganic particles, therefore more significantly enhancing the dispersion stability of the ink. The primary average particle size can be determined with an optical microscope.

The content of the inorganic particles is preferably 0.1 to 7.5% by mass, more preferably 0.5 to 5% by mass, still more preferably 0.5 to 2.5% by mass based on the total amount of the ink. A content of the inorganic particles of not less than 0.1% by mass more significantly enhances the dispersibility of the pigment and reduces the contact angle of the ink. A content of the inorganic particles of 7.5% by mass or less can prevent sedimentation of the inorganic particles, therefore more significantly enhancing the dispersion stability of the ink.

(Poly(meth)acrylate)

The ink may further contain poly(meth)acrylate. The poly(meth)acrylate contained in the ink more significantly enhances the wettability of the pigment with the ink and thus dispersibility of the pigment in the ink. The poly(meth)acrylate has an effect of increasing viscosity and preventing sedimentation of the pigment (particularly inorganic pigments). As a result, a larger amount of the pigment can be stably dispersed in the ink, therefore more significantly enhancing the color developability of the written product obtained using the ink. Furthermore, the poly(meth)acrylate can prevent the pigment and the inorganic particles such as silica from being separatedly dispersed from each other in the ink, thus more significantly preventing color separation.

Examples of the poly(meth)acrylate include, but not limited to, salt with alkali metals such as sodium; alkaline earth metals such as calcium; and ammonia and amines such as ethylamine, diethylamine, triethylamine, and propylamine.

The content of the poly(meth)acrylate is preferably 0.1 to 2% by mass, more preferably 0.25 to 1.25% by mass, still more preferably 0.45 to 0.9% by mass based on the total amount of the ink. A content of the poly(meth)acrylate of not less than 0.1% by mass more significantly enhances the dispersibility of the pigment. A content of the poly(meth)acrylate of 2% by mass or less reduces drying properties of the writing surfaces and prevents an increase in viscosity of the ink.

(Polyoxyalkylene Compound)

The ink may further contain a polyoxyalkylene compound. The polyoxyalkylene compound contained in the ink tends to prevent the pigment and the inorganic particles such as silica from being separately dispersed from each other in the ink, and prevent color separation. Examples of the polyoxyalkylene compound include, but not limited to, polyoxyalkylene alkyl ethers, polyoxyethylene alkylphenyl ethers, polyoxyethylene alkyl esters, polyoxyethylenealkylamides, and glycerol alkyl esters. Among these compounds, polyoxyalkylene alkyl ether is preferred.

The content of the polyoxyalkylene compound is preferably 0.05 to 1% by mass, more preferably 0.1 to 0.5% by mass, still more preferably 0.15 to 0.25% by mass based on the total amount of the ink. A content of the polyoxyalkylene compound of not less than 0.05% by mass more significantly enhances the dispersibility of the pigment. A content of the polyoxyalkylene compound of 1% by mass or less more significantly enhances the fixing properties of the writing surfaces and prevents a reduction in drying properties of the writing surfaces.

[Resin Nanoparticles]

The ink may further contain resin nanoparticles. Examples of resins for the resin nanoparticles include, but not limited to, acrylic resins, fluorinated resins, polystyrene resins, polyester resins, vinyl chloride resins, vinyl acetate resins, vinyl chloride vinyl acetate copolymerized resins, urethane resins, acrylamide resins, epoxy resins, and copolymerized resins thereof. Among these resins, acrylic resin nanoparticles and fluorinated resin nanoparticles are preferred. These resins can be used singly or in combination. The "resin nanoparticles" include resins dispersed in the ink such as emulsions and dispersions of wax particles.

Examples of the acrylic resin nanoparticles include, but not limited to, polymerized products of (meth)acrylic monomers such as (meth)acrylic acid and (meth)acrylate ester; and copolymerized products of (meth)acrylic monomers and other monomers such as styrene.

Examples of the fluorinated resin nanoparticles include, but not limited to, polytetrafluoroethylene, perfluoroalkoxyalkane, perfluoroethylenepropene copolymers, ethylene-tetrafluoroethylene copolymers, poly(vinylidene fluoride), polychlorotrifluoroethylene, ethylene-chlorotrifluoroethylene copolymers, tetrafluoroethylene-perfluorodioxole copolymers, and polyvinyl fluoride. Use of fluorinated resin particles having relatively high water repellency and low specific gravity more significantly enhances the dispersion stability of the pigment and the abrasion resistance of the resulting written product.

The resin nanoparticles have a primary average particle size of preferably 0.1 to 10 μm, more preferably 0.5 to 5 μm. A primary average particle size of the resin nanoparticles within this range more significantly enhances the dispersion stability of the ink. The primary average particle size can be determined with an optical microscope.

The content (solid content) of the acrylic resin nanoparticles is preferably 5 to 17.5% by mass, more preferably 7.5 to 15% by mass, still more preferably 9 to 12% by mass based on the total amount of the ink. A content of the acrylic resin nanoparticles of not less than 5% by mass more significantly enhances the fixing properties of the drawn lines to objects. A content of the acrylic resin nanoparticles of 17.5% by mass or less can prevent an increase in viscosity of the ink, and more significantly enhances the dispersibility of the ink. In an embodiment in which the acrylic resin nanoparticles are dispersed in a solution, the content indicates the solid content of the acrylic resin nanoparticles (the same is true below).

The content (solid content) of the fluorinated resin nanoparticles is preferably 0.1 to 5% by mass, more preferably 0.5 to 2% by mass, still more preferably 0.75 to 1.25% by mass based on the total amount of the ink. A content of the fluorinated resin nanoparticles of not less than 0.1% by mass more significantly enhances the fixing properties of the drawn lines to objects and moisture resistance of the drawn lines. A content of the fluorinated resin nanoparticles of 5% by mass or less can prevent an increase in viscosity of the ink, and more significantly enhances the dispersibility of the ink.

[Other Components]

The ink may further contain a variety of additives such as an anti-repellent, a moisturizing agent, a preservative agent, and a pH adjuster when necessary.

(Anti-Repellent: Silicone)

The ink may further contain silicone as an anti-repellent. The silicone contained in the ink reduces the surface tension of the ink. The reduced surface tension of the ink reduces the contact angle thereof, and more significantly prevents the repellency.

Examples of the silicone include, but not limited to, polyether-modified silicone, polyester-modified silicone, amino-modified silicone, epoxy-modified silicone, aliphatically modified silicone, aromatically modified silicone, higher fatty acid-modified silicone, fluorine-modified silicone, carboxy-modified silicone, polyglycerol-modified silicone, epoxy polyether-modified silicone, and alkyl polyether-modified silicone. Among these silicones, polyether-modified silicone is preferred. Use of such a silicone more significantly enhances the dispersibility of the pigment and reduces the contact angle of the ink. The "polyether-modified silicone" indicates silicone having a polyether group. Other modified silicones are also defined similarly.

The content of the silicone is preferably 0.5 to 7.5% by mass, more preferably 1 to 5% by mass, still more preferably 1.5 to 3% by mass based on the total amount of the ink. A content of the silicone of not less than 0.5% by mass more significantly reduces the contact angle of the ink. A content of the silicone of 7.5% by mass or less can prevent an excess reduction in contact angle of the ink.

(Moisturizing Agent)

The ink may further contain a moisturizing agent. Examples of the moisturizing agent include, but not limited to, those usually used in the ink. Examples of the moisturizing agent include organic solvents having boiling points of preferably 140° C. or more, more preferably 160° C. or more, still more preferably 180° C. or more. A moisturizing agent having a boiling point within this range tends to be less volatile, and tends to have a high moisturizing effect. Specific examples of such a moisturizing agent include, but not limited to, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol, 1,3-propylene glycol, isopropylene glycol, isobutylene glycol, glycerol, mesoerythritol, and pentaerythritol.

The content of the moisturizing agent is preferably 0 to 5% by mass, more preferably 0 to 2.5% by mass, still more preferably 0 to 1% by mass based on the total amount of the ink. The moisturizing agent tends to prevent drying of the ink in the tips of pens and the like while reducing the drying properties of the ink written on the food product packaging materials, prolonging stickiness of the written product for a relatively long time, and reducing the moisture resistance of the written product. For these reasons, a content of the moisturizing agent of 5% by mass or less tends to more significantly enhance the drying properties and the moisture resistance of the written product and prevent the stickiness thereof. A content of the moisturizing agent of not less than 0% by mass can prevent drying of the ink in the tips of the pens and the like.

[Structure of Writing Tool]

The aqueous writing tool for a food product packaging material of the present embodiment can be suitably used as writing tools such as writing tools with ink reservoir, writing tools without ink reservoir (also referred to as "direct ink feed type" writing tools), and stamps.

More specifically, the "writing tool with ink reservoir" indicates a writing tool including an ink holder accommodating a bundle of fibers (ink reservoir) and a tip of a pen (tip) from which the ink stored in the ink reservoir flows, in which the tip of the pen includes a ball, a bundle of fibers, a plastic tip, a brush-shaped nib, a sintered product, or an ink brush-shaped product. The "writing tool without ink reservoir" indicates a writing tool having no ink reservoir, including an ink holder storing an ink as it is, and a tip of a pen from which the ink stored in the ink storing portion flows, in which the tip of the pen includes a ball, a bundle of fibers, a plastic core, a brush-shaped product, a sintered product, or an ink brush-shaped product. Furthermore, the "stamp" indicates a writing tool that performs writing by pressing a substrate filled with an ink against an object of writing to bleed the ink from the substrate.

Among these writing tools, the aqueous writing tool for a food product packaging material of the present embodiment is preferably an writing tool with ink reservoir. A configuration of the writing tool with ink reservoir can stabilize writing in any direction of the writing tool such as a horizontal or upward direction.

EXAMPLES

The present invention will now be more specifically described by way of Examples and Comparative Examples. The present invention will not be limited to the following Examples.

Examples and Comparative Examples

Components were mixed according to each of the compositions shown in Tables 1 and 2 below to prepare pigment dispersion liquids Y and W. Components were mixed with the resulting pigment dispersion liquids Y and W according to each of the compositions shown in Table 3 to prepare ink compositions. The resulting inks were each charged into an ink reservoir of a writing tool with ink reservoir including a tip of a pen to prepare aqueous writing tools for a food product packaging material.

TABLE 1

| | Components | Parts by mass |
|---|---|---|
| Pigment dispersion liquid Y | C.I. PIGMENT Yellow 55 | 33 |
| | Aluminum silicate | 6 |
| | Acrylic resin*[1] | 6 |
| | Isopropyl alcohol | 2 |
| | Water | 53 |

*[1]manufactured by BASF Japan Ltd., product name: Joncryl J-450

TABLE 2

| | Components | Parts by mass |
|---|---|---|
| Pigment dispersion liquid W | Titanium dioxide | 55 |
| | Ethylene glycol | 10 |
| | Dispersant*[2] | 1 |
| | Water | 34 |

*[2]manufactured by Nikko Chemicals Co., Ltd., product name: NIKKOL BL-21

[Color Developability]

A product name Saran Wrap (registered trademark) (manufactured by Asahi Kasei Home Products Corporation, made of vinylidene chloride) was provided as a food product packaging material. A region of 5 cm² squares in arbitrary place of the wrap film was filled with the aqueous writing tool for a food product packaging material. The region of 5 cm² squares was carefully filled such that the ink was not applied on the portions on which the tip of the pen already had run, and the amount of the ink applied onto the region of 5 cm² squares was not varied between samples. The hazes of the resulting samples were measured with a haze meter (manufactured by Nippon Denshoku Industries Co., Ltd., NDH5000).

Subsequently, the wrap films above were left under a condition at 25° C. and a relative humidity of 60% for a certain exposure time varied from 10 seconds to 120 seconds at an interval of 5 seconds. Written products were thereby prepared. The written products were rubbed with KimWipes under a load of 500 g to check for peel of the ink. The exposure time for which the sample having no peel of the ink was obtained is shown in Table 3.

TABLE 3

|  |  | Example |  |  |  |  |  |  | Comparative Example |  |  |  |
|---|---|---|---|---|---|---|---|---|---|---|---|---|
|  |  | 1 | 2 | 3 | 4 | 5 | 6 | 7 | 1 | 2 | 3 | 4 |
| Pigment dispersion liquid Y | wt % | 4.5 | 17.3 | 23 | 28 | 23 | 23 | 23 | 15.4 | 15.4 | 15.4 | 51.3 |
| Pigment dispersion liquid W | wt % | 15 | 15 | 20 | 25 | 20 | 20 | 20 | 0 | 0 | 0 | 0 |
| Silicone | wt % | 2 | 2 | 2 | 2 | 2 | 2 | 2 | 2 | 2 | 2 | 2 |
| Acrylic resin nanoparticles (solid content) | wt % | 25 | 25 | 25 | 25 | 25 | 25 | 25 | 25 | 25 | 25 | 25 |
| Fluorinated resin nanoparticles (solid content) | wt % | 1 | 1 | 1 | 1 | 1 | 1 | 1 | 1 | 1 | 1 | 1 |
| Silica | wt % | 1 | 1 | 1 | 1 | 0 | 1 | 1 | 0 | 1 | 5 | 1 |
| Polyoxyalkylene alkyl ether | wt % | 0.2 | 0.2 | 0.2 | 0.2 | 0 | 0.2 | 1 | 0.1 | 0.2 | 1 | 0.2 |
| Poly(meth)acrylate | wt % | 1 | 1 | 1 | 1 | 0 | 1 | 1 | 0 | 1 | 1 | 1 |
| DISPERBYK 2010 | wt % | 2 | 2 | 2 | 2 | 2 | 2 | 5.5 | 0 | 2 | 10 | 2 |
| Preservative agent | wt % | 0.2 | 0.2 | 0.2 | 0.2 | 0.2 | 0.2 | 0.2 | 0.2 | 0.2 | 0.2 | 0.2 |
| Moisturizing agent | wt % | 0 | 0 | 0 | 0 | 0 | 0 | 0 | 0 | 0 | 0 | 0 |
| Water | wt % | Balance | Balance | Balance | Balance | Balance | Balance | Balance | Balance | Balance | Balance | Balance |
| Solid content of white pigment | wt % | 8.52 | 9.288 | 12.38 | 15.43 | 12.38 | 12.38 | 12.38 | 0.924 | 0.924 | 0.924 | 3.078 |
| Solid content of color pigment | wt % | 1.485 | 5.709 | 7.59 | 9.24 | 7.59 | 7.59 | 7.59 | 5.082 | 5.082 | 5.082 | 16.929 |
| Total solid content of pigments | wt % | 10.005 | 14.997 | 19.97 | 24.67 | 19.97 | 19.97 | 19.97 | 6.006 | 6.006 | 6.006 | 20.007 |
| Total content of dispersants | wt % | 2.6 | 2.6 | 2.65 | 2.7 | 1 | 2.65 | 4.85 | 0.1 | 2.45 | 10.45 | 2.45 |
| Color developability (HAZE) |  | <61 | 61.0 | >80 | >80 | 80.0 | >80 | <80 | 2.0 | 20.0 | <20 | <80 |
| Stability |  | ○ | ○ | ○ | Δ | ○ | ○ | Δ | Δ | ○ | × | × |
| Fixing properties |  | 25 seconds | 15 seconds | 20 seconds | 35 seconds | 15 seconds | 20 seconds | 35 seconds | 40 seconds | 40 seconds | 120 seconds or more | 60 seconds or more |

[Stability]

The viscosity of each of the inks was measured. Subsequently, the inks were each placed in a 50 mL glass bottle. These bottles were sealed with stoppers, were placed in a thermostat at 60° C., and were stored for 1 week. The inks were then cooled to room temperature, and the viscosity was measured with a tuning fork vibration viscometer (SV-1A). The stability of the ink was evaluated from an increasing rate of viscosity between the viscosity before storage and that after storage (ratio of the viscosity of the ink after storage to that of the ink before storage):

○: The increasing rate of viscosity is 0 to 2%.

Δ: The increasing rate of viscosity is more than 2 and 5% or less.

x: The increasing rate of viscosity is more than 5%.

[Fixing Properties]

A product name Saran Wrap (registered trademark) (manufactured by Asahi Kasei Home Products Corporation, made of vinylidene chloride) was provided as a food product packaging material. A circular region having a diameter of 3 cm in arbitrary place of the wrap film was filled with the aqueous writing tool for a food product packaging material. The amount of the ink applied at this time was 600 μg/cm².

[Silica]

Sunsphere H-31 manufactured by AGC Si-Tech. Co., Ltd.

[Silicone]

KF6011 (polyether-modified silicone), manufactured by Shin-Etsu Chemical Co., Ltd.,

[Resin Nanoparticles]

NEOCRYL A-1120 (acrylic resin nanoparticles), manufactured by Kusumoto Chemicals, Ltd.

KTL-1N (fluorinated resin nanoparticles), manufactured by KITAMURA LIMITED

[Polyoxyalkylene Alkyl Ether]

product name NIKKOL BL-21 (polyoxyethylene alkyl ether) manufactured by Nikko Chemicals Co., Ltd.

[Poly(meth)acrylate]

Aqualic L-DL (sodium polyacrylate), manufactured by NIPPON SHOKUBAI CO., LTD.

[Others]

DISPERBYK 2010, manufactured by BYK-Chemie GmbH

[Preservative Agent]

New Side S-01 (sodium dehydroacetate), manufactured by The Nippon Synthetic Chemical Industry Co., Ltd.

[Moisturizing Agent]

product name: ethylene glycol (compound name: ethylene glycol), manufactured by Mitsubishi Chemical Corporation

INDUSTRIAL APPLICABILITY

The aqueous writing tool for a food product packaging material of the present embodiment has industrial applicability as a writing tool comprising a water-based ink with which writing can be readily done on food product packaging materials to provide drawn lines not repelled by those packaging materials.

The invention claimed is:

1. An aqueous writing tool for a food product packaging material comprising an ink comprising two or more pigments and one or more dispersants, wherein
    at least two of the pigments being a white pigment and a color pigment having a color other than white,
    the total content of the pigments being 10 to 25% by mass based on the total amount of the ink, and
    the total content of the dispersants being 1 to 5% by mass based on the total amount of the ink,
    wherein the ink further contains fluorinated resin nanoparticles and
    a solid content of the fluorinated resin nanoparticles is 0.1 to 5% by mass based on the total amount of the ink.

2. The aqueous writing tool for a food product packaging material according to claim 1, wherein
    the dispersants comprise one or more dispersants selected from the group consisting of an inorganic particle, a polyoxyalkylene compound, and a poly(meth)acrylate.

3. The aqueous writing tool for a food product packaging material according to claim 1, wherein
    a content of the color pigment is 5 to 15% by mass based on the total amount of the ink.

4. The aqueous writing tool for a food product packaging material according to claim 1, wherein
    a content of the color pigment is 5 to 10% by mass based on the total amount of the ink.

5. The aqueous writing tool for a food product packaging material according to claim 2, wherein
    a content of a poly(meth)acrylate is 0.1 to 2% by mass based on the total amount of the ink.

6. The aqueous writing tool for a food product packaging material according to claim 2, wherein
    a content of a poly(meth)acrylate is 0.45 to 0.9% by mass based on the total amount of the ink.

7. The aqueous writing tool for a food product packaging material according to claim 2, wherein
    a content of a polyoxyalkylene compound is 0.05 to 1% by mass based on the total amount of the ink.

8. The aqueous writing tool for a food product packaging material according to claim 2, wherein
    a content of a polyoxyalkylene compound is 0.15 to 0.25% by mass based on the total amount of the ink.

9. The aqueous writing tool for a food product packaging material according to claim 1, wherein the ink further includes silicone and
    a content of the silicone is 0.5 to 7.5% by mass based on the total amount of the ink.

10. The aqueous writing tool for a food product packaging material according to claim 1, wherein the ink further includes silicone and
    a content of the silicone is 1.5 to 3% by mass based on the total amount of the ink.

11. The aqueous writing tool for a food product packaging material according to claim 1, wherein the ink further contains acrylic resin nanoparticles and
    a solid content of the acrylic resin nanoparticles is 5 to 17.5% by mass based on the total amount of the ink.

12. The aqueous writing tool for a food product packaging material according to claim 1, wherein the ink further contains acrylic resin nanoparticles and
    a solid content of the acrylic resin nanoparticles is 9 to 12% by mass based on the total amount of the ink.

13. An aqueous writing tool for a food product packaging material comprising an ink comprising two or more pigments and one or more dispersants, wherein
    at least two of the pigments being a white pigment and a color pigment having a color other than white,
    the total content of the pigments being 10 to 25% by mass based on the total amount of the ink, and
    the total content of the dispersants being 1 to 5% by mass based on the total amount of the ink,
    wherein the ink further contains fluorinated resin nanoparticles and
    a solid content of the fluorinated resin nanoparticles is 0.75 to 1.25% by mass based on the total amount of the ink.

14. The aqueous writing tool for a food product packaging material according to claim 13, wherein
    the dispersants comprise one or more dispersants selected from the group consisting of an inorganic particle, a polyoxyalkylene compound, and a poly(meth)acrylate.

15. The aqueous writing tool for a food product packaging material according to claim 13, wherein
    a content of the color pigment is 5 to 15% by mass based on the total amount of the ink.

16. The aqueous writing tool for a food product packaging material according to claim 13, wherein
    a content of the color pigment is 5 to 10% by mass based on the total amount of the ink.

17. The aqueous writing tool for a food product packaging material according to claim 13, wherein the ink further includes silicone and
    a content of the silicone is 0.5 to 7.5% by mass based on the total amount of the ink.

18. The aqueous writing tool for a food product packaging material according to claim 13, wherein the ink further includes silicone and
    a content of the silicone is 1.5 to 3% by mass based on the total amount of the ink.

19. The aqueous writing tool for a food product packaging material according to claim 13, wherein the ink further contains acrylic resin nanoparticles and
    a solid content of the acrylic resin nanoparticles is 5 to 17.5% by mass based on the total amount of the ink.

20. The aqueous writing tool for a food product packaging material according to claim 13, wherein the ink further contains acrylic resin nanoparticles and
    a solid content of the acrylic resin nanoparticles is 9 to 12% by mass based on the total amount of the ink.

* * * * *